US012368272B2

(12) United States Patent
Schneider

(10) Patent No.: US 12,368,272 B2
(45) Date of Patent: Jul. 22, 2025

(54) BUS BAR CONNECTOR

(71) Applicant: Ennovi Industries, Inc., East Providence, RI (US)

(72) Inventor: Richard Schneider, Livonia, MI (US)

(73) Assignee: ENNOVI INDUSTRIES, INC., East Providence, RI (US)

( * ) Notice: Subject to any disclaimer, the term of this patent is extended or adjusted under 35 U.S.C. 154(b) by 395 days.

(21) Appl. No.: 18/027,099

(22) PCT Filed: Sep. 30, 2021

(86) PCT No.: PCT/US2021/052797
§ 371 (c)(1),
(2) Date: Mar. 18, 2023

(87) PCT Pub. No.: WO2022/076233
PCT Pub. Date: Apr. 14, 2022

(65) Prior Publication Data

US 2023/0335961 A1 Oct. 19, 2023

Related U.S. Application Data

(60) Provisional application No. 63/089,276, filed on Oct. 8, 2020.

(51) Int. Cl.
*H01R 25/16* (2006.01)
*H01R 4/48* (2006.01)
(Continued)

(52) U.S. Cl.
CPC ............ *H01R 25/162* (2013.01); *H01R 4/48* (2013.01); *H01R 13/2421* (2013.01); *H01R 13/6584* (2013.01)

(58) Field of Classification Search
CPC .... H01R 25/162; H01R 25/161; H01R 25/16; H01R 4/48; H01R 13/6584; H01R 13/2421
See application file for complete search history.

(56) References Cited

U.S. PATENT DOCUMENTS 3,845,451 A * 10/1974 Neidecker .............. H01R 13/28 439/787
3,895,853 A * 7/1975 Neidecker ................ H01H 1/10 439/810
(Continued)

FOREIGN PATENT DOCUMENTS

CN 111211427 A 5/2020
DE 10017319 A1 10/2001
(Continued)

OTHER PUBLICATIONS

International Search Report for PCT/US2021/052797 dated Jan. 17, 2022.
(Continued)

*Primary Examiner* — Harshad C Patel
(74) *Attorney, Agent, or Firm* — Paul Katterle

(57) ABSTRACT

A connector assembly for connecting a bus bar to an electrical component. The connector assembly includes an electrically conductive housing defining an inner cavity. A plurality of canted coil contacts are partially disposed within the inner cavity and protrude therefrom so as to be partially disposed outside the housing. The coil contacts are electrically connected to the housing. A first end portion of an electrically conductive, flexible bridge is connected to the housing. A second end portion of the bridge is configured for connection to the electrical component. A holding apparatus holds the housing against the bus bar such that the coil contacts are pressed against the bus bar to make an electrical connection therewith.

20 Claims, 9 Drawing Sheets

(51) Int. Cl.

| | |
|---|---|
| ***H01R 13/24*** | (2006.01) |
| ***H01R 13/6584*** | (2011.01) |

(56) References Cited

U.S. PATENT DOCUMENTS

| | | | | |
|---|---|---|---|---|
| 4,013,329 | A * | 3/1977 | Hugin | H01R 13/187 439/709 |
| 4,174,143 | A * | 11/1979 | Hicks, Jr. | H02G 5/007 174/88 B |
| 4,462,657 | A * | 7/1984 | Snowdon | H01R 13/187 439/840 |
| 4,583,065 | A | 4/1986 | Favre-Tissot | |
| 4,973,370 | A | 11/1990 | Kreinberg | |
| 4,981,449 | A * | 1/1991 | Buchter | H01R 25/162 174/88 B |
| 4,983,132 | A * | 1/1991 | Weidler | H01R 25/162 439/786 |
| 5,139,243 | A | 8/1992 | Balsells | |
| 5,163,221 | A | 11/1992 | Favre-Tissot | |
| 5,541,380 | A | 7/1996 | Ogden | |
| 5,588,884 | A * | 12/1996 | Rudoy | H01R 31/02 439/787 |
| 6,121,560 | A | 9/2000 | Turkmen | |
| 6,835,084 | B2 | 12/2004 | Poon | |
| 6,974,343 | B2 | 12/2005 | Zheng | |
| 7,055,812 | B2 | 6/2006 | Balsells | |
| 7,128,620 | B2 | 10/2006 | Maura | |
| 7,678,995 | B2 * | 3/2010 | Hengel | H01R 4/4881 174/88 B |
| 8,128,441 | B2 * | 3/2012 | Mukuno | H01R 13/187 439/845 |
| 8,254,078 | B2 | 8/2012 | Sutton | |
| 8,336,864 | B2 | 12/2012 | Noh | |
| 8,844,126 | B2 | 9/2014 | Frederick | |
| 8,926,351 | B2 * | 1/2015 | O'Leary | H02G 5/007 174/68.2 |
| 9,033,748 | B2 | 5/2015 | Ramey | |
| 9,190,791 | B1 * | 11/2015 | Jaena | H01R 25/162 |
| 9,270,044 | B2 | 2/2016 | Hara | |
| 9,590,405 | B1 * | 3/2017 | Maurer | H01R 25/145 |
| 9,590,406 | B1 * | 3/2017 | Maurer | H02G 5/007 |
| 9,859,630 | B2 | 1/2018 | MacNaughton | |
| 1,050,430 | A1 | 8/2018 | Steinberg | |
| 10,218,101 | B2 | 2/2019 | Grzywok | |
| 10,224,658 | B2 * | 3/2019 | Marsh | H01R 13/426 |
| 10,256,560 | B2 * | 4/2019 | Fertig | H01R 13/35 |
| 10,263,368 | B2 | 4/2019 | Young | |
| 10,395,793 | B2 | 8/2019 | Satou | |
| 10,622,743 | B2 | 4/2020 | Kimura | |
| 11,749,926 | B2 * | 9/2023 | Jung | B60R 16/02 439/889 |
| 2013/0130556 | A1 | 5/2013 | Blakborn | |
| 2015/0004812 | A1 | 1/2015 | Hara | |
| 2019/0288467 | A1 | 9/2019 | Mastrovito | |

FOREIGN PATENT DOCUMENTS

| | | |
|---|---|---|
| JP | 2018006246 A | 1/2018 |
| KR | 100937392 B1 | 1/2010 |

OTHER PUBLICATIONS

Written Opinion of ISA for PCT/US2021/052797 dated Jan. 17, 2022.

* cited by examiner

BUS BAR CONNECTOR

CROSS-REFERENCE TO RELATED APPLICATION(S)

This application is the U.S. national phase of PCT Application No. PCT/US2021/052797 filed on 30 Sep. 2021, which claims the benefit of priority under 35 U.S.C. § 119(e) to U.S. Provisional Patent Application No. 63/089,276 filed on 8 Oct. 2020, which is herein incorporated by reference.

TECHNICAL FIELD

This disclosure relates generally to connectors for fastening together two parts to convey power and, more particularly, to connectors for fastening a bus bar to another bus bar or other electrical component.

BACKGROUND

Bus bars are commonly used to provide power to electrical and electronic components. Conventionally, a bus bar is a bar composed of a conductive metal, such as copper or a copper alloy, and is relatively wide and thick to better conduct electric current. Due to its composition, thickness and configuration, a bus bar is difficult to establish a secure electrical connection to. Typically, connections are made using large, complicated connectors that require numerous openings to be formed in the bus bar. Moreover, such connectors do not readily accommodate different orientations of the bus bar and the component it is being connected to. As such, it would be desirable to have a bus bar connector that is compact and permits a bus bar and another electrical components to be connected together in different orientations. The present disclosure is directed to such a bus bar connector and a method of using the same to make electrical connections.

SUMMARY

In accordance with the disclosure, a connector is provided for connecting a bus bar to an electrical component. The connector assembly includes an electrically conductive housing defining an inner cavity. One or more canted coil contacts are partially disposed within the inner cavity and protrude therefrom so as to be partially disposed outside the housing. The one or more canted coils are electrically connected to the housing. A first end portion of an electrically conductive, flexible bridge is connected to the housing. A second end portion of the bridge is configured for connection to the electrical component. A holding apparatus releasably holds the housing against the bus bar such that the one or more coil contacts are pressed against the bus bar to make an electrical connection therewith.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
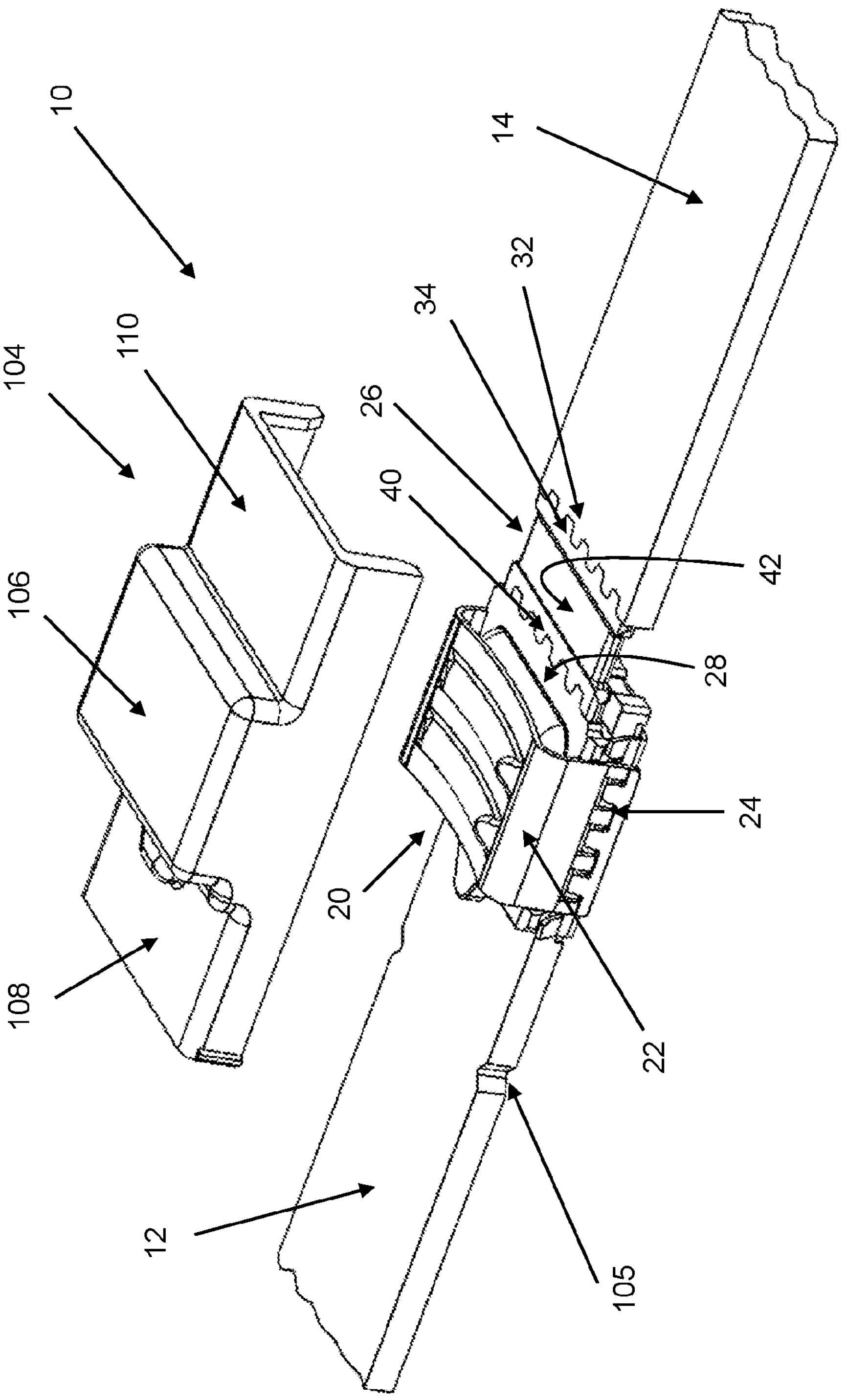
FIG. 1 shows a side perspective view of a touch guard spaced above a first bus bar assembly having a first connector assembly constructed in accordance with a first embodiment.

It should be noted that in the detailed description that follows, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Spatially relative terms, such as “top”, “bottom”, “lower”, “above”, “upper”, and the like, are used herein merely for ease of description to describe one element or feature’s relationship to another element(s) or feature(s) as they are illustrated in (a) drawing figure(s) being referred to. It will be understood that the spatially relative terms are not meant to be limiting and are intended to encompass different orientations of the device in use or operation in addition to the orientation depicted in the drawings.

Figure 2:
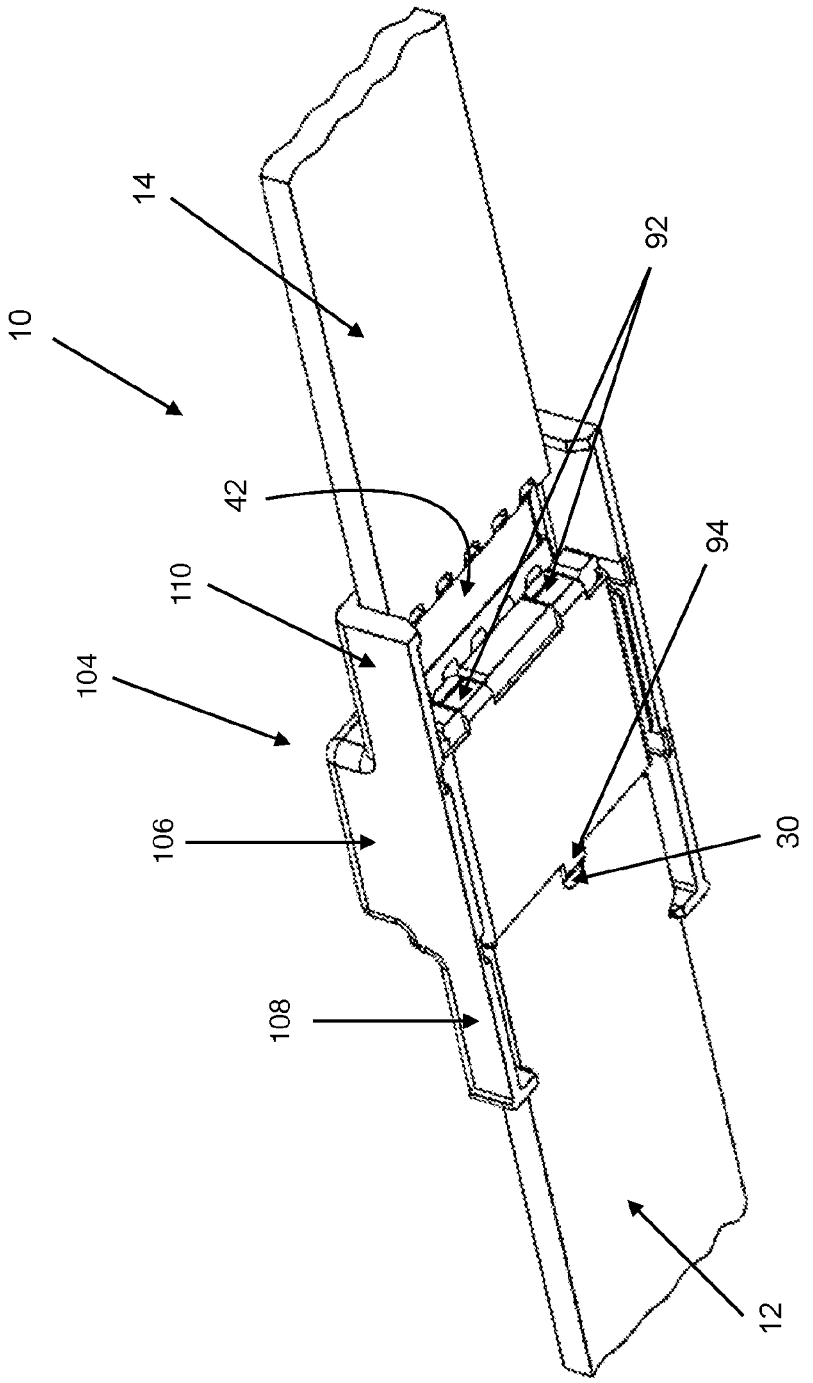
FIG. 2 shows a bottom perspective view of the first bus bar assembly with the touch guard mounted thereto.
Figure 3:
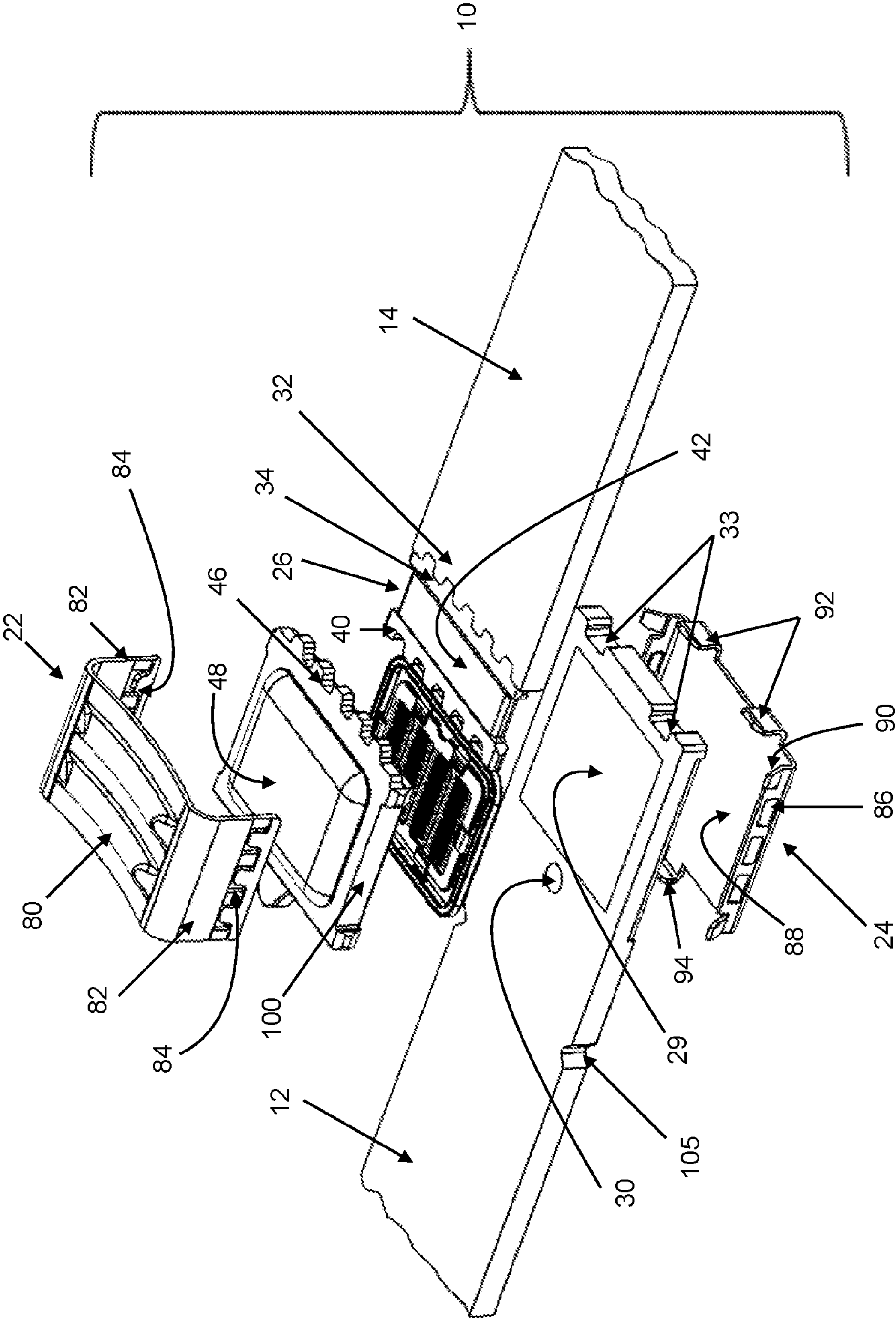
FIG. 3 shows a partially exploded side perspective view of the first bus bar assembly.

Referring now to FIGS. 1-3, there is shown a bus bar assembly 10 constructed in accordance with a first embodiment. The bus bar assembly 10 includes a first bus bar 12 connected by a connector assembly 20 to a second bus bar 14. The connector assembly 20 includes an upper bracket 22, a lower bracket 24, a bridge 26 and a contact assembly 28. A touch guard 104 may be provided for covering the connector assembly 20.

The first and second bus bars 12, 14 are elongated, have a generally rectangular cross-section and may be constructed from a conductive metal, such as copper or a copper alloy, which may or may not be plated with another metal, such as tin or nickel. An area 29 of the first bus bar 12 may be plated (such as with silver) or otherwise conditioned to provide a good electrical contact surface. A hole 30 is formed in the first bus bar 12, proximate to the area 29, while notches 33 are formed in a front edge of the first bus bar 12.

The second bus bar 14 has a connection end 32 that is configured to enmesh or interlock with a first end portion 34 of the bridge 26. More specifically, the connection end 32 has crenellations or teeth that comprise a series of alternating tabs and grooves that enmesh with a corresponding series of alternating tabs and grooves (i.e., teeth) formed in the first end portion 34 to thereby form an edge-to-edge connection between the second bus bar 14 and the bridge 26. The enmeshed connection end 32 and first end portion 34 may be secured together by welding, such as laser welding, ultrasonic welding or resistance welding.

Instead of having an edge-to-edge connection, the bridge 26 and the second bus bar 14 may be connected together with a simple lap joint, wherein a portion of the bridge 26 overlaps the second bus bar 14 (or vice versa) and is welded thereto.

In addition to the first end portion 34, the bridge 26 includes a second end portion 40, which has crenellations or teeth that comprise a series of alternating tabs and grooves. A flexible portion 42 is joined between the first and second end portions 34, 40. The flexible portion 42 may be a strap or cable of braided wire comprised of a conductive metal, such as copper or a copper alloy, which may or may not be plated with another metal, such as tin or nickel. The first and second end portions 34, 40 may be separate components secured to ends of the flexible portion 42, or they may be formed from the flexible portion 42. More specifically, ends of a length of braided cable may be compressed into solid structures, which are then stamped to produce teeth, thereby forming the first and second end portions 34, 40. In such a manner, the bridge 26 may be a single-piece structure formed from a length of braided cable. The flexibility of the bridge 26 enables a connection to be made between two rigid assemblies that accommodates a degree of positional error (in roll, pitch and yaw) between the assemblies without affecting the proper seating of the assemblies.

The second end portion 40 of the bridge 26 is configured to enmesh or interlock with an edge portion 46 of a housing 48 of the contact assembly 28. More specifically, the teeth of the second end portion 40 enmesh with a corresponding series of alternating tabs and grooves (i.e., teeth) formed in the edge portion 46 of the housing 48, to thereby form an edge-to-edge connection between the bridge 26 and the housing 48. In this manner, the housing 48 is electrically and mechanically connected to the second bus bar 14 by the bridge 26.

Instead of having an edge-to-edge connection, the bridge 26 and the housing 48 may be connected together with a simple lap joint, wherein a portion of the bridge 26 overlaps the housing 48 (or vice versa) and is welded thereto.

Figure 4:
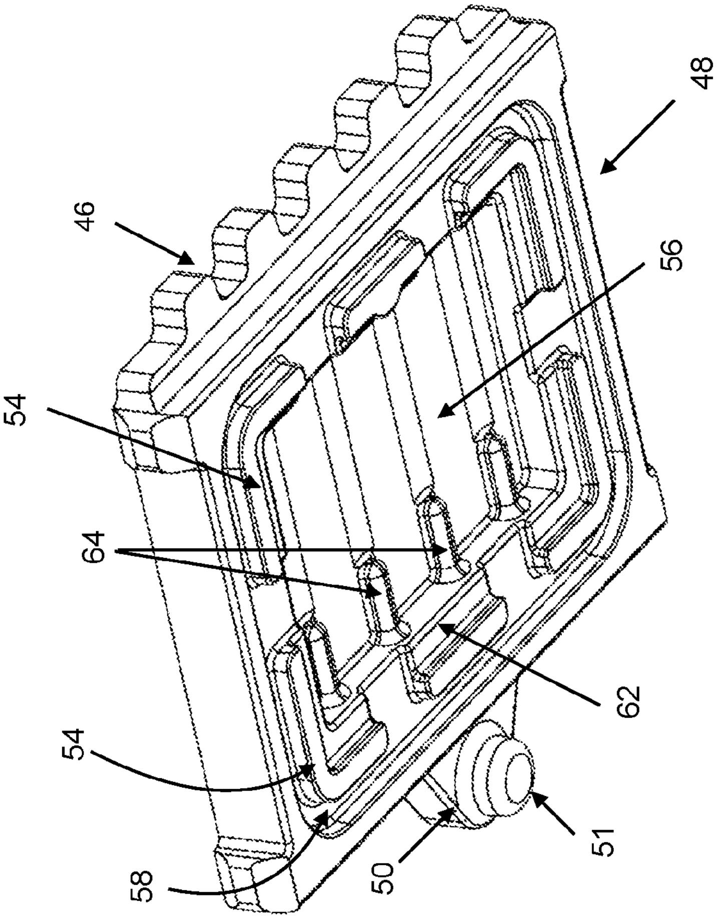
FIG. 4 shows a bottom perspective view of a housing of a contact assembly of the first connector assembly.
Figure 6:
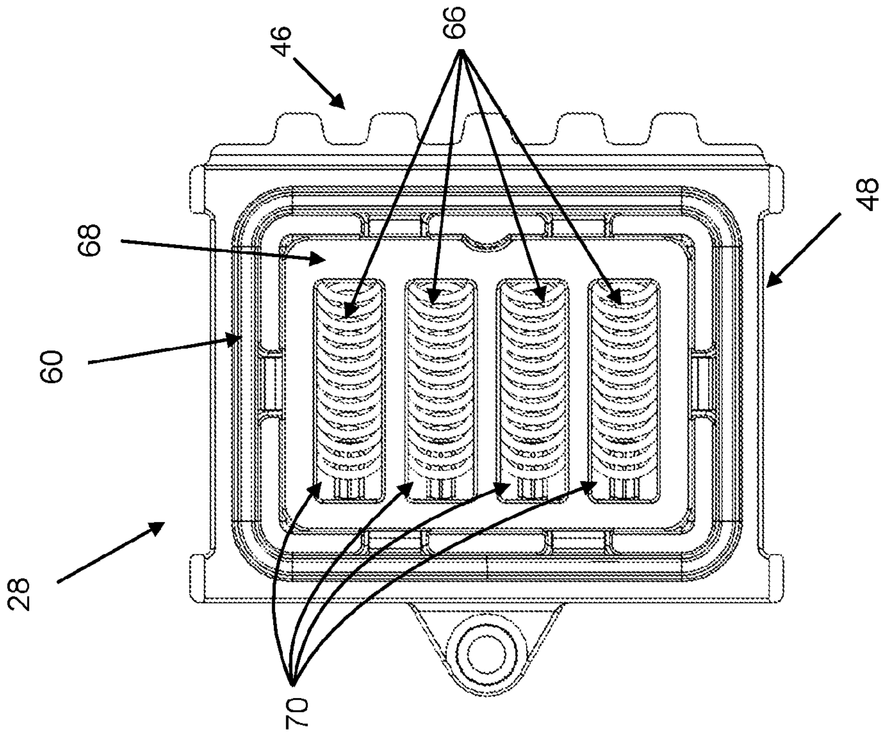
FIG. 6 shows a bottom plan view of the contact assembly.
Figure 5:
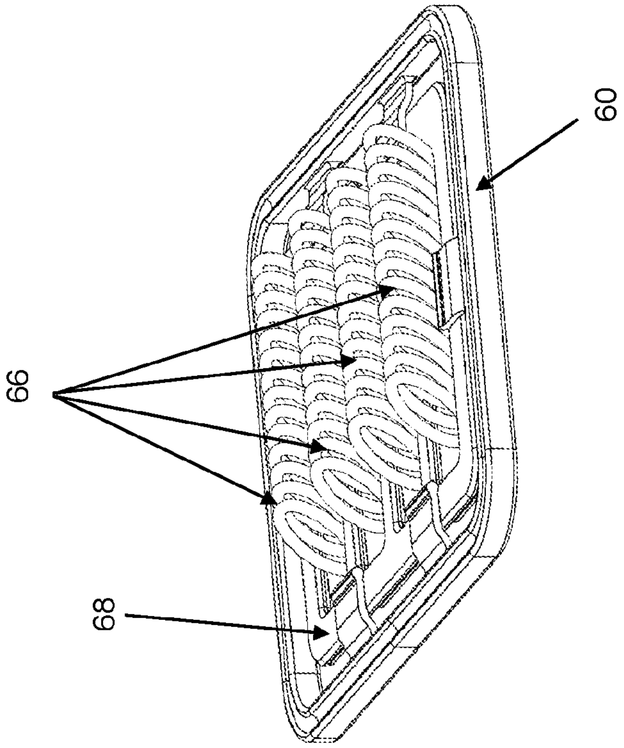
FIG. 5 shows a top side perspective view of a portion of the contact assembly that includes coil contacts mounted in a holding frame and surrounded by a sealing gasket.
Figure 7:
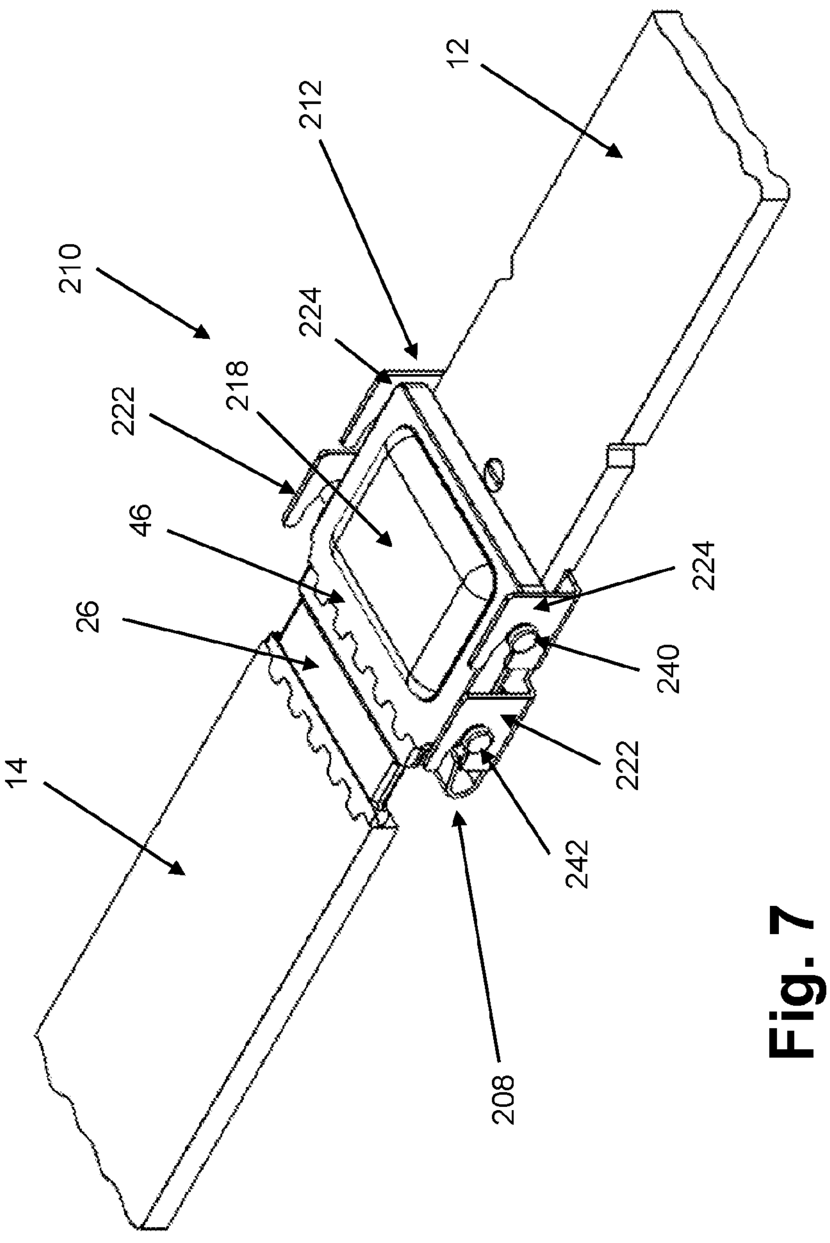
FIG. 7 shows a side perspective view of a second bus bar assembly having a second connector assembly constructed in accordance with a second embodiment, wherein the second connector assembly is connecting together two bus bars.
Figure 8:
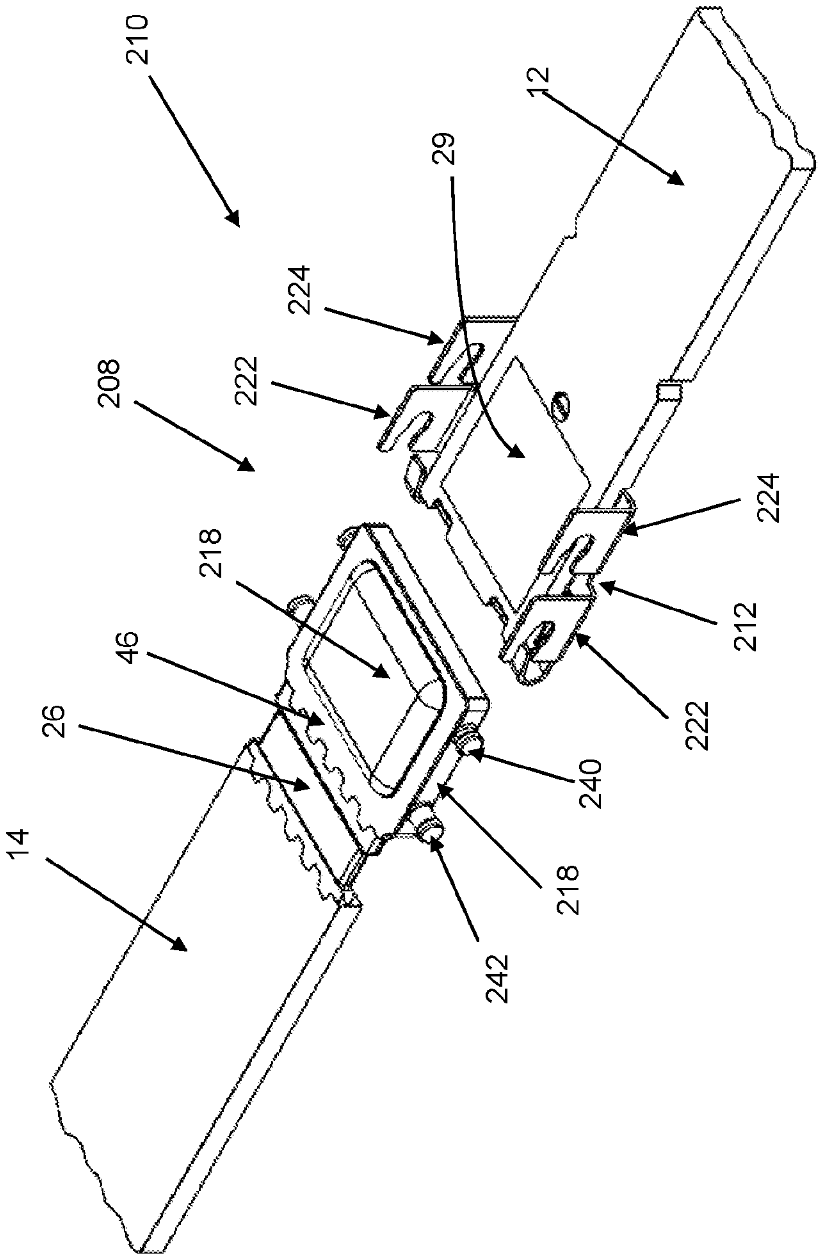
FIG. 8 shows a side perspective view of the second bus bar assembly, wherein the bus bars are not connected together.

Referring now to FIGS. 4-6, the housing 48 may be a unitary or monolithic structure that is formed from a conductive metal, such as copper or a copper alloy, which may or may not be plated with another metal, such as silver, tin or nickel. A projection 50 is joined to the housing 48 on a posterior end, opposite to the edge portion 46. An anchor pin 51 extends downwardly from the projection 50. Inside the housing 48 there is a main cavity 52 with a frame-shaped guide 54 disposed therein. The guide 54 is disposed around and helps define a central holding cavity 56. The guide 54 defines a peripheral groove 58 adapted for receiving and holding an elastomeric sealing gasket 60. Gaps may be formed in the guide 54 to accommodate inwardly-extending tabs of the sealing gasket 60. The guide 54 has a stepped cross-section so as to form an inner shelf 62. A series of stops 64 are disposed inside the holding cavity 56. The stops 64 are spaced-apart and disposed toward a posterior end of the holding cavity 56.

In addition to the housing 48, the contact assembly 28 includes a plurality of coil contacts 66 mounted in a holding frame 68. The coil contacts 66 are formed from copper or, more preferably, a copper alloy, such as C18080, which is an alloy of copper, chromium, silicon, titanium, silver and iron. Another suitable copper alloy is C151, which is an alloy of copper and zirconium. The coil contacts 66 are pre-loaded and canted in an axial direction. The holding frame 68 is planar and has a plurality of slots 70 formed therein. The coil contacts 66 are trapped within the slots 70 so as to be secured within the housing 48. The holding frame 68, with the coil contacts 66 mounted thereto, is disposed on the shelf 62 of the guide 54. The holding frame 68 may be secured to the shelf 62, such as by press-fit or welding. With the holding frame 68 so positioned, top portions of the coil contacts 66 are disposed in the holding cavity 56 and are pressed against an interior surface of the housing 48, thereby making an electrical connection therewith. The stops 64 project inward, toward ends of the coil contacts 66, and are in engagement therewith. The stops 64 help maintain the canted configuration of the coil contacts 66, respectively.

In some embodiments, the contact assembly 28 may further include the sealing gasket 60. As set forth above, the sealing gasket 60 is secured within the groove 58 and is disposed around the holding frame 68 with the coil contacts 66. The sealing gasket 60 may have a ribbed construction and may be comprised of silicone rubber or another type of water-resistant elastomer. As will be described more fully below, the seal 68 is used to form a seal with the first bus bar 12 when the contact assembly 28 is pressed into engagement with the first bus bar 12 by the upper and lower brackets 22, 24. In some embodiments, the sealing gasket 60 may not be necessary and may not be included in the contact assembly 28.

The upper bracket 22 may be formed from heat-treated steel or other structural material. The steel may be provided with a zinc chromate, nickel or other protective finish. The upper bracket 22 is channel-shaped and includes a base 80 joined between a pair of outwardly-extending arms 82. Toward free ends of the arms 82, first engagement structures 84 may be formed in the arms 82, respectively. Each engagement structure 84 includes a series of openings with inwardly slanting tabs disposed therein. The engagement structures 84 are configured to interlock with second engagement structures 86 that may be formed in the lower bracket 24.

The lower bracket 24 may also be formed from heat-treated steel provided with a protective finish. The lower bracket 24 includes a base plate 88 having a pair of side flanges 90 joined to opposing side edges thereof. A pair of L-shaped front tabs 92 are joined to a front edge of the base plate 88, while an L-shaped rear tab 94 is joined to a rear edge of the base plate 88. The side flanges 90 include the second engagement structures 86, respectively. Each second engagement structure 86 includes a series of openings with inwardly slanting tabs disposed therein.

Referring back to FIGS. 1-3, the first and second bus bars 12, 14 may be connected together with the connector assembly 20 in a number of different ways, using different sequences of steps. For example, the bridge 26 may first be secured between the housing 48 of the contact assembly 28 and the second bus bar 14. More specifically, the first end portion 34 of the bridge 26 may be interlocked with the connection end 32 of the second bus bar 14 and the second end portion 40 of the bridge 26 may be interlocked with the edge portion 46 of the housing 48. The interlocked pieces may then be secured together by welding or other means. Thereafter, the upper bracket 22 may be snapped into position over the housing 48 of the contact assembly 28 such that the base 80 presses against a top surface of the housing

48 and the arms 82 press against opposing sides of the housing 48, with the arms 82 being engaged in shallow and elongated notches 100 (shown in FIG. 3) formed in opposing sides of the housing 48, thereby fastening the contact assembly 28 to the second bus bar 14. The lower bracket 24 may also be mounted to the first bus bar 12 by placing a lower surface of the first bus bar 12 onto the base plate 88 such that the rear tab 94 of the lower bracket 24 partially extends into the hole 30 of the first bus bar 12 and the front tabs 92 extend through the notches 33 of the first bus bar 12.

With the lower bracket 24 secured to the first bus bar 12 and the upper bracket 22 and the contact assembly 28 secured to the second bus bar 14, the two assemblies are then aligned with each other such that the anchor pin 51 of the housing 48 is aligned with the hole 30 in the first bus bar 12 and the coil contacts 66 protruding downward from the housing 48 are aligned with the area 29 on the first bus bar 12. The two assemblies are then pressed together to insert the anchor pin 51 in the hole 30 and to press the upper bracket 22 into engagement with the lower bracket 24 such that the engagement structures 84 in the upper bracket 22 interlock with the second engagement structures 86 in the lower bracket 24, thereby mechanically securing together the first and second bus bars 12, 14. When the two assemblies are secured together as described above, lower portions of the coil contacts 66 are compressed against the area 29, thereby making a good electrical connection between the coil contacts 66 and the first bus bar 12. Since the coil contacts 66 are electrically connected to the second bus bar 14 through the housing 48, the first and second bus bars 12, 14 are also electrically connected together when the two assemblies are mechanically secured together using the upper and lower brackets 22, 24.

With the first and second bus bars 12, 14 connected together as described above, the flexibility of the bridge 26 allows the first and second bus bars 12, 14 to be mounted in correct positions, even though there may be a misalignment between the two positions in terms of roll, pitch and/or yaw.

As described above, the upper and lower brackets 22, 24 function as a clamping assembly for releasably holding the housing 48 against the first bus bar 12 such that the coil contacts 66 are pressed against the first bus bar 12 to make an electrical connection therewith. More specifically, the upper bracket 22 is configured to act as a stiff spring that is strong enough to overcome the forces from the coil contacts 66 and the sealing gasket 60, while taking up the stacked thickness tolerances of the rigid components inside, e.g. the first and second bus bars 12, 14. When the housing 48 is held against the first bus bar 12 in this manner, the sealing gasket 60 is also pressed against the first bus bar 12, thereby forming a seal around the periphery of the holding cavity 56 and the coil contacts 66 disposed therein. The seal prevents the ingress of water into holding cavity 56 and into contact with the coil contacts 66.

In order to protect against electric shock during assembly and/or service, the touch guard 104 may be provided for covering the connector assembly 20, as shown in FIGS. 1 and 2. The touch guard 104 may be comprised of electrically insulating plastic and includes a raised center section 106 disposed between first and second channel sections 108, 110. The center section 106 covers the connector assembly 20, while the first and second channel sections 108, 110 cover portions of the first and second bus bars 12, 14, respectively. Open ends of the first and second channel sections 108, 110 may be provided with inwardly-extending flanges for engaging notches 105 (shown in FIGS. 1 and 3) in the first and second bus bars 12, 14 to releasably secure the touch guard 104 to the first and second bus bars 12, 14.

Referring now to FIG. 7-10, there is shown a bus bar assembly 210 constructed in accordance with a second embodiment. The bus bar assembly 210 has the same construction as the bus bar assembly 10, except for the differences described below. Generally, the bus bar assembly 210 has a connector assembly 208, instead of the connector assembly 20. The connector assembly 208 does not have the upper and lower brackets 22, 24. Instead, the connector assembly 208 has a track bracket 212. In addition, the connector assembly 208 has a housing 218, instead of the housing 48.

Figure 9:
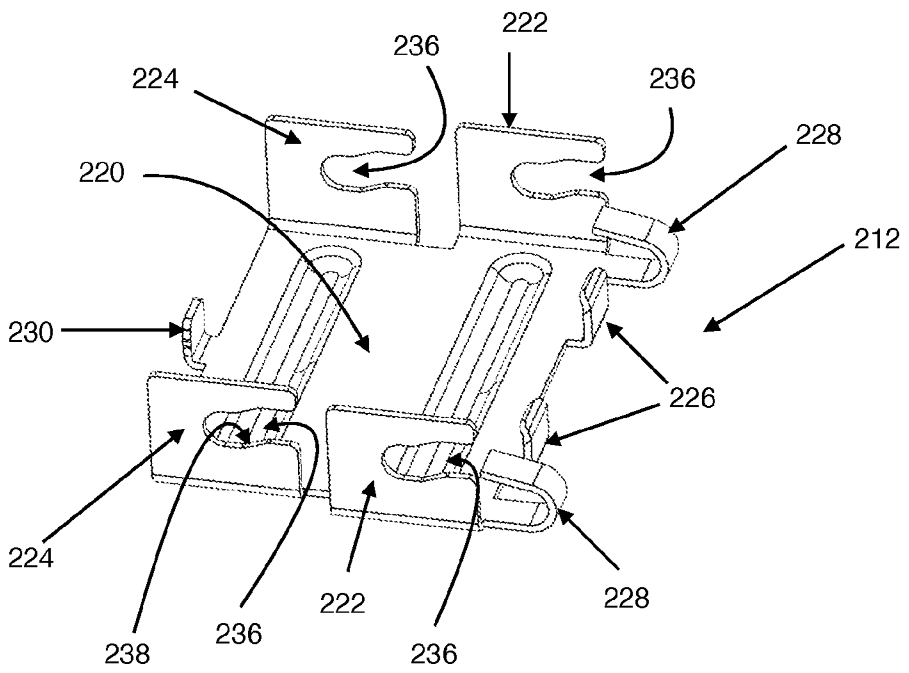
FIG. 9 shows a top perspective view of a track bracket of the second connector assembly.
Figure 10:
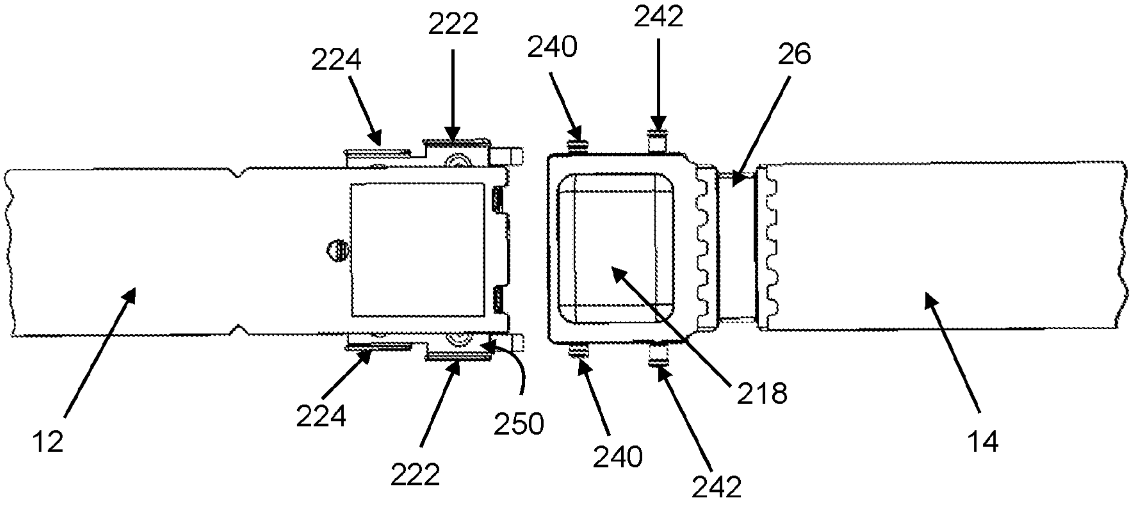
FIG. 10 shows a top plan view of the second bus bar assembly, wherein the bus bars are not connected together.

As shown best in FIG. 9, the track bracket 212 has a ribbed base 220 with opposing side edges, a pair of first track structures 222 and a pair of second track structures 224. A pair of L-shaped front tabs 226 and a pair of spring guides 228 are joined to a front edge of the base 220, while an L-shaped rear tab 230 is joined to a rear edge of the base 220. A first track structure 222 and a second track structure 224 are joined to each side edge of the base 220 and extend upwardly therefrom. The first track structures 222 are disposed proximate to a front of the track bracket 212, while the second track structures 224 are disposed distal to the front of the track bracket 212. The side edges are stepped such that the first track structures 222 are disposed laterally outward from the second track structures 224, as best shown in FIG. 10. Each of the first and second track structures 222, 224 has a track slot 236 formed therein. Each track slot 236 has an open end disposed toward the front of the track bracket 212 and is defined by an interior edge 238 that acts as a cam surface.

The track bracket 212 may be mounted to the first bus bar 12 by placing a lower surface of the first bus bar 12 onto the base 220 such that the rear tab 230 of the track bracket 212 partially extends into the hole 30 of the first bus bar 12 and the front tabs 226 extend through the notches 33 of the first bus bar 12. With the track bracket 212 so mounted, first and second track structures 222, 224 are disposed on opposing sides of the first bus bar 12, with the open ends of the track slots 236 facing forward, toward the front of the first bus bar 12.

The housing 218 has the same construction as the housing 48, except the housing 218 does not have the projection 50 with the anchor pin 51. In addition, the housing 218 has a pair of first lugs 240 and a pair of second lugs 242 extending therefrom. More specifically, a first lug 240 and a second lug 242 are joined to each side of the housing 48 in a spaced-apart manner and extend laterally outward therefrom. The first lugs 240 are disposed proximate to the posterior end of the housing 218, opposite to the edge portion 46, while the second lugs 242 are disposed proximate to the edge portion 46. As best shown in FIG. 10, the second lugs 242 extend laterally outward farther than the first lugs 240.

The housing 218 (mounted to the second bus bar 14) is connected to the track bracket 212 (mounted to the first bus bar 12) by aligning the posterior of the housing 218 with the front of the track bracket 212 such that the first lugs 240 are laterally aligned with spaces 250 between the first track structures 222 and the first bus bar 12 and are at the level of the openings to the track slots 236. The housing 218 and the track bracket 212 are brought together such that the first lugs 240 pass through the spaces 250 and enter the track slots 236 in the second track structures 224 and the second lugs 242 enter the track slots 236 in the first track structures 222. As the first and second lugs 240, 242 move through the track slots 236, they engage the interior edges 238 and are guided downward, which moves the housing 218 and the coil contacts 66 downward, toward the first bus bar 12. When the first and second lugs 240, 242 abut the closed ends of the track slots 236, lower portions of the coil contacts 66 are pressed against the area 29, thereby making a good electrical connection between the coil contacts 66 and the first bus bar 12.

Although not shown, a touch guard may be provided for covering the connector assembly 208. The touch guard may have substantially the same construction as the touch guard 104, except the center section may be configured differently to accommodate the track bracket 212, instead of the upper and lower brackets 22, 24.

Figure 11:
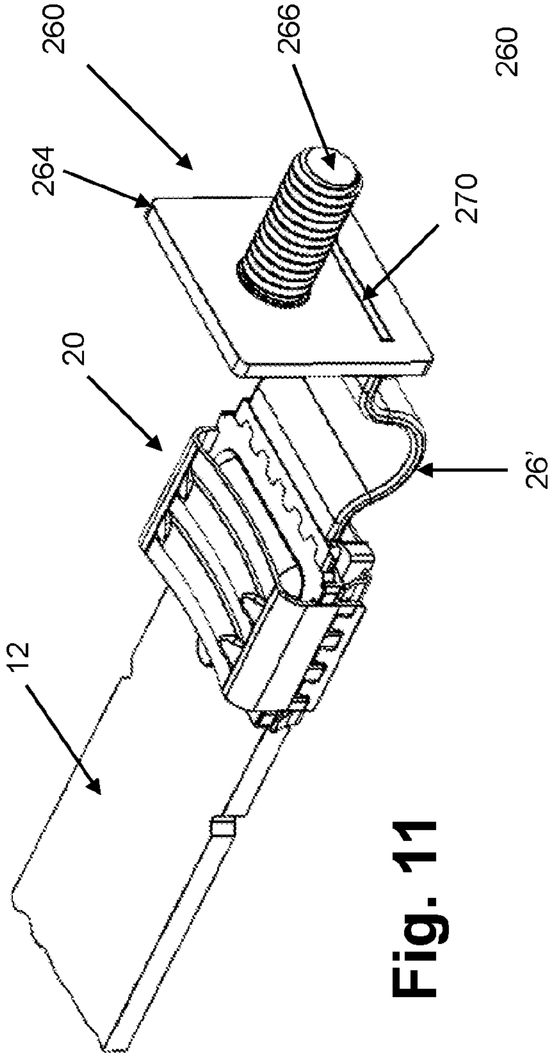
FIG. 11 shows a front side perspective view of an electrical component assembly that includes the first connector assembly connecting a bus bar to a terminal assembly.
Figure 12:
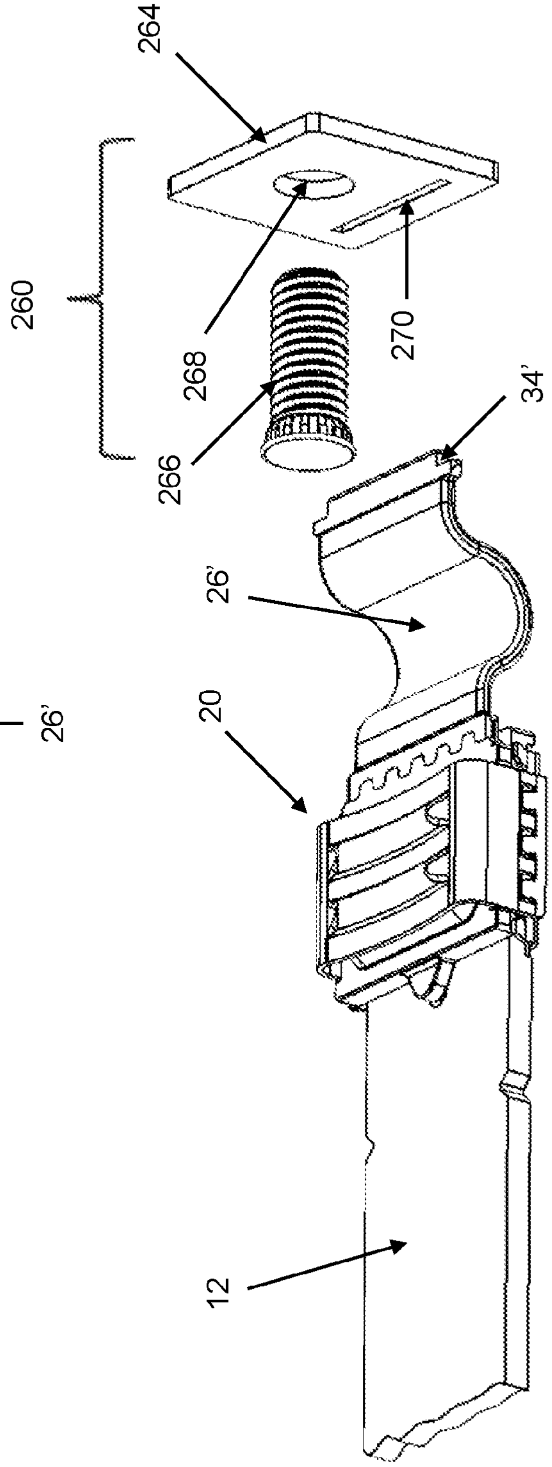
FIG. 12 shows a partially exploded side perspective view of the electrical component assembly of FIG. 11.

It should be appreciated that instead of being used to connect together the first and second bus bars 12, 14, the connector assemblies 20, 208 may each be used to connect the first bus bar 12 to another electrical component. For example, as shown in FIGS. 11 and 12, the connector assembly 20' may be used to connect the first bus bar 12 to a terminal assembly 260. The connector assembly 20' has the same construction as the connector assembly 20, except the connector assembly 20' has a bridge 26' instead of the bridge 26. The bridge 26' has the same construction as the bridge 26, except the bridge 26' does not have a first end portion 34 with teeth. Instead, the bridge 26' has a first end portion 34' with a solid tongue.

The terminal assembly 260 includes a mounting plate 264 and a threaded bolt 266. The mounting plate 264 has a hole 268 extending therethrough and a slot 270 disposed below the hole 268. The bolt 266 extends through the hole 268, with a head of the bolt 266 abutting an inner surface of the mounting plate 264. A threaded body of the bolt 266 projects outwardly from an outer surface of the mounting plate 264. The bolt 266 may be secured within the hole 268 by a threaded coupling between the bolt 266 and an interior edge of the plate 264 and/or by welding. The first end portion 34' of the bridge 26' is disposed in the slot 270 and is secured therein by press-fit and/or welding.

The bolt 266 may function as a power terminal, which, by way of example, may be used for connection to a lug of an insulated cable.

The connector assembly 20, 208 of the present disclosure provides a number of benefits over traditional bus bar connector assemblies. The connector assembly 20, 208 has a small foot print, but can accommodate high current. In addition, the connector assembly 20, 208 can be facilely operated to repeatedly connect and disconnect electrical components. Moreover, the flexible bridge 26 permits connections to be made between electrical components in different orientations. The sealing gasket 60 enables a water proof connection to be made between the connector assembly 20, 208 and an electrical component (e.g. first bus bar 12). The edge-to-edge connection of the bridge 26 to the housing 48, 218 and to an electrical component (such as the second bus bar 14) forms a low profile connection between the connector assembly 20, 208 and the electrical component, which is desirable for many applications. For example, the low profile connection facilitates the mounting of a sleeve over the connector assembly 20, 208 and the two electrical components, e.g., the first and second bus bars 14. The sleeve may be composed of electrical insulating material to insulate the connection. Moreover the sleeve may be water proof to facilitate the formation of a water proof connection between electrical components, e.g. the first and second bus bars 12, 14.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A connector assembly for connecting a bus bar to an electrical component, the connector assembly comprising:

an electrically conductive housing defining an inner cavity;

one or more canted coil contacts partially disposed within the inner cavity and protruding therefrom so as to be partially disposed outside the housing, the one or more coil contacts being electrically connected to the housing;

an electrically conductive, flexible bridge having a first end portion connected to the housing and a second end portion configured for connection to the electrical component; and holding apparatus for releasably holding the housing against the bus bar such that the one or more coil contacts are pressed against the bus bar to make an electrical connection therewith.

2. The connector assembly of claim 1, further comprising an elastomeric gasket mounted to the housing and extending around the inner cavity, the elastomeric gasket forming a seal with the bus bar when the clamping assembly holds the housing against the bus bar.

3. The connector assembly of claim 2, further comprising a touch guard comprised of electrically insulating plastic, the touch guard including a center section disposed between first and second outer sections, the center section being adapted to cover the housing, the first section being adapted to cover the bus bar and the second section being adapted to cover the electrical component.

4. The connector assembly of claim 1, wherein the bridge comprises a strap formed from braided wire comprised of a conductive metal.

5. The connector assembly of claim 4, wherein the first and second end portions of the bridge are solid structures with teeth formed therein;

wherein the housing has an edge portion with teeth formed therein; and wherein the teeth of the housing are enmeshed with the teeth of the first end portion of the bridge.

6. The connector assembly of claim 5, wherein the enmeshed teeth of the housing and the first end portion of the bridge are welded together.

7. The connector assembly of claim 1, wherein the holding apparatus comprises first and second brackets for clamping together the bus bar and the housing such that the one or more coil contacts are pressed against a surface of the bus bar.

8. The connector assembly of claim 7, wherein the first bracket has a first base joined between a pair of outwardly-extending arms with first engagement structures, respectively, and wherein the second bracket has a second base with side flanges that include second engagement structures, respectively, whereby the first and second brackets may be connected together by the interlocking of the first and second engagement structures, with the housing and the bus bar clamped between the first and second bases.

9. The connector assembly of claim 1, wherein the holding apparatus comprises a track bracket and a plurality of lugs joined to opposing sides of the housing, the track bracket includes a base with opposing sides having track structures extending upwardly therefrom, the track structures having slots formed by cammed edges, respectively, whereby when the bus bar is placed on the base of the track bracket and the lugs are moved into the slots of the track structures, the movement of the lugs over the cammed edges moves the housing downward to press the one or more coil contacts against a surface of the bus bar.

10. A bus bar assembly comprising the connector assembly of claim 1, wherein the bus bar is a first bus bar and the electrical component is a second bus bar, wherein the second bus bar has an end portion with teeth formed therein and wherein the second end portion of the bridge has teeth formed therein, the teeth of the second bus bar and the teeth of the second end portion of the bridge being enmeshed to connect together the second bus bar and the bridge.

11. The bus bar assembly of claim 10, wherein the bridge comprises a strap formed from braided wire comprised of a conductive metal, and wherein opposing end portions of the strap are compressed to be solid and form the first and second end portions of the bridge, respectively.

12. The bus bar assembly of claim 11, wherein the first end portion of the bridge has teeth formed therein, wherein the housing has an edge portion with teeth formed therein, and wherein the teeth of the housing are enmeshed with the teeth of the first end portion of the bridge.

13. The bus bar assembly of claim 12, wherein the enmeshed teeth of the housing and the first end portion of the bridge are welded together, and wherein the enmeshed teeth of the second bus bar and the second end portion of the bridge are welded together.

14. The bus bar assembly of claim 10, wherein the one or more coil contacts comprise a plurality of coil contacts, wherein the first bus bar has opposing, planar first and second surfaces, and wherein the housing is disposed over the first bus bar, with the coil contacts pressed against the first surface of the first bus bar.

15. The bus bar assembly of claim 14, further comprising an elastomeric gasket mounted to the housing and extending around the inner cavity, the elastomeric gasket forming a seal with the first surface of the first bus bar.

16. The bus bar assembly of claim 14, wherein the holding apparatus comprises:

a first bracket having a first base joined between a pair of outwardly-extending arms with first engagement structures, respectively, the first bracket being disposed over the housing with the first base disposed against the housing; and a second bracket having a second base with side flanges that include second engagement structures, respectively, the second base of the second bracket being disposed against the second surface of the first bus bar; and wherein the first and second brackets are connected together by the interlocking of the first and second engagement structures, with the housing and the bus bar being clamped between the first and second bases.

17. The bus bar assembly of claim 14, wherein the holding apparatus comprises:

a track bracket and a plurality of lugs joined to opposing sides of the housing, the track bracket including a base with opposing sides having track structures extending upwardly therefrom, the track structures having slots formed by cammed edges, respectively; and wherein the second surface of the first bus bar is disposed on the base of the track bracket and the lugs of the housing are disposed in the slots of the track structures, respectively, the interaction of the lugs with the cammed edges of the track structures pressing the coil contacts against the first surface of the first bus bar.

18. A method of connecting together the bus bar to the electrical component using the connector assembly of claim 1, the method comprising:

placing a first component of the holding apparatus against a second surface of the bus bar; and positioning the housing relative to the bus bar such that the one or more coil contacts are disposed against a first surface of the bus bar; and wherein the first and second surfaces of the bus bar are planar and are opposite each other.

19. The method of claim 18, further comprising:

placing a second component of the holding apparatus against the housing; and fastening the second component of the holding apparatus to the first component of the holding apparatus, thereby clamping the housing and the bus bar together.

20. The method of claim 18, wherein positioning the housing comprises aligning a second component of the holding apparatus with the first component of the holding apparatus and moving the housing and the bus bar together in a direction parallel to a longitudinal axis of the bus bar, which causes the first and second components to move relative to each other, thereby moving the housing toward the bus bar and pressing the one or more coil contacts against the first surface of the bus bar.

* * * * *